US010973254B2

(12) United States Patent
Humphrey et al.

(10) Patent No.: US 10,973,254 B2
(45) Date of Patent: Apr. 13, 2021

(54) APPLICATOR FOR PARTICULATE ADDITIVES

(71) Applicant: HOLLISON, LLC, Owensboro, KY (US)

(72) Inventors: David E. Humphrey, Calhoun, KY (US); Joseph T. Payne, Jr., Owensboro, KY (US)

(73) Assignee: HOLLISON, LLC, Owensboro, KY (US)

( * ) Notice: Subject to any disclaimer, the term of this patent is extended or adjusted under 35 U.S.C. 154(b) by 199 days.

(21) Appl. No.: 15/957,304

(22) Filed: Apr. 19, 2018

(65) Prior Publication Data

US 2018/0303149 A1 Oct. 25, 2018

Related U.S. Application Data

(60) Provisional application No. 62/487,166, filed on Apr. 19, 2017.

(51) Int. Cl.
*A23P 20/12* (2016.01)
*B05B 7/14* (2006.01)

(52) U.S. Cl.
CPC ............ *A23P 20/12* (2016.08); *B05B 7/1404* (2013.01)

(58) Field of Classification Search
CPC ............................... A23P 20/12; B05B 7/1404
See application file for complete search history.

(56) References Cited

U.S. PATENT DOCUMENTS 3,219,392 A * 11/1965 Gerber .................... E04F 21/12 406/36
3,804,303 A 4/1974 Fassauer
4,709,860 A 12/1987 Patrick et al.
(Continued)

FOREIGN PATENT DOCUMENTS

| | | | |
|---|---|---|---|
| CA | 1187537 | A | 5/1985 |
| EP | 0059394 | A2 | 9/1982 |
| WO | 2009004053 | A1 | 1/2009 |

OTHER PUBLICATIONS

The United States Patent and Trademark Office; The International Search Report and the Written Ppinion of the International Searching Authority; International Search Report and Written Opinion; dated Jul. 6, 2018; pp. 1-34; The United States Patent Office; US.

*Primary Examiner* — Rick K Chang
(74) *Attorney, Agent, or Firm* — Wyatt, Tarrant & Combs, LLP; Stephen C. Hall

(57) ABSTRACT

A controls stage, a hopper stage, and a pneumatic stage are arranged to govern the movement of particulate additives from a hopper through a receptacle that communicates with a delivery tube with the particles exiting the delivery tube via an outlet and contacting products or commodities such as food products. Embodiments include those wherein the use of air flow through the delivery tube is responsible for ushering particulate additives out of the delivery tube, with or without a secondary air flow to facilitate movement of particulate additives into the delivery tube, and a notched disc controlling the opening and closing of a valve to allow or restrict particulates from passing, wherein the size and quantity of notches affects the frequency at which particulate additives move from the hopper into the delivery tube.

6 Claims, 8 Drawing Sheets

(56) References Cited

U.S. PATENT DOCUMENTS

| | | | |
|---|---|---|---|
| 4,875,811 A * | 10/1989 | Merrett | B60P 1/60 |
| | | | 406/39 |
| 5,071,289 A | 12/1991 | Spivak | |
| 5,813,801 A | 9/1998 | Newbolt et al. | |
| 6,129,037 A | 10/2000 | Watts et al. | |
| 6,360,920 B1 * | 3/2002 | Corominas | B65B 3/32 |
| | | | 222/262 |
| 6,892,909 B1 | 5/2005 | Hebert et al. | |
| 2008/0308579 A1 * | 12/2008 | Luechinger | G01F 13/001 |
| | | | 222/239 |
| 2010/0206220 A1 | 8/2010 | Belzowski et al. | |
| 2011/0017770 A1 * | 1/2011 | Maas | B67D 1/0462 |
| | | | 222/1 |
| 2011/0310695 A1 | 12/2011 | Sus et al. | |
| 2012/0039733 A1 * | 2/2012 | Smith | F01C 20/14 |
| | | | 418/9 |
| 2013/0025576 A1 * | 1/2013 | Busato | F02M 26/71 |
| | | | 123/568.11 |
| 2014/0158433 A1 * | 6/2014 | Bisset | E21B 34/08 |
| | | | 175/218 |
| 2015/0319917 A1 | 11/2015 | Henry et al. | |
| 2016/0095276 A1 | 4/2016 | Roberge et al. | |
| 2018/0228989 A1 * | 8/2018 | Buck | A61M 15/009 |
| 2019/0186973 A1 * | 6/2019 | Vine | G01F 11/18 |

\* cited by examiner

APPLICATOR FOR PARTICULATE ADDITIVES

CROSS REFERENCE TO RELATED U.S. APPLICATION

This patent application claims the benefit of priority to U.S. Provisional Patent Application Ser. No. 62/487,166, with a filing date of Apr. 19, 2017, the contents of which are incorporated herein by reference.

FIELD OF INVENTION

Present embodiments relate to systems and apparatuses providing an applicator for delivering probiotics or other particulate additives from a hopper to a commodity undergoing manufacturing or handling processes, such as but not limited to a food commodity.

BACKGROUND

Food is a commodity produced in a number of different steps in manufacturing facilities. Some foods are made using a conveyor system that transports the food materials through a series of processing steps. A particular step in the production system may involve the addition of particulate additives to the food commodity. Such a step may occur at any point in the food commodity production steps, but commonly occurs after the solid food pieces have been formed so that particulate additives are applied to the food. The production of many different types of food can benefit from an improved delivery system for applying particulate additives, or, simply, particulates.

Generally, particulate additives are lightweight particles that can be moved through air using an air-driven force, i.e., pneumatic. Various kinds of probiotics are in the form of low-density particles that can be driven along with pneumatic force. Other particulate additives include various nutrients, spices, preservatives, and other solid particulates that a food commodity producer may wish to apply on a surface of the food.

Present embodiments are directed to a delivery system for applying particulate additives to a food commodity. A food commodity might include, without limitation, human food, pet food, grain, wheat, vegetables, tea, spices, flavorings, peanuts, coffee beans, soybeans, and other agricultural products. Pharmaceutical products, consumer products, and health products like multivitamins and supplements are non-limiting examples of other commodities.

Various delivery systems—manual and automatic—exist already. A common limitation for currently available delivery systems is the difficulty in regulating the amount of particulate additives applied to the food commodity. Generally, a given fan speed setting results in the same amount of particulate additives being applied regardless every time the machine is used. Changing the fan speed setting to meet the particular needs of a manufacturing process is a time-consuming endeavor marked by much trial and error. In a plant, fan speed changes create additional inefficiencies when a line processes a variety of products, each having unique manufacturing specifications. Instead of constantly setting new fan speeds, an option that provides greater flexibility and reliability is disclosed herein in which the rate at which the particulate additives move from the hopper is controlled.

A consistent and more efficient manner of applying particulate additives with a pneumatic system is needed. Greater flexibility is needed to be able to vary the quantities of particulate additives applied to a food commodity or other commodities at a given fan speed or range of fan speeds. A system that allows a user to insert and remove pieces in relation to the delivery system to achieve variation in the amount and speed of application would provide significant benefits to the relevant industries. Accordingly, a more efficient delivery system that better meets current needs is described herein.

SUMMARY

A feature of the present embodiments is to control the rate at which particulate additives are delivered to a food commodity or some other commodity. The embodiments and alternatives set forth herein can be practiced in an automatic mode or a manual mode. Automatic would be associated with production cycles where the delivery of particulate additives is done on a regular and recurrent at the same settings or at settings which can be remotely adjusted. Manual would be associated with changing the settings for each batch.

A further advantage allows the user to determine the frequency at which the particulate additives are applied to the food commodity. Generally, this application will occur at or near the end of a food commodity production cycle. Take, for example, the production of dog food in kibble form. A step that is sometimes employed for a food commodity, which occurs near the end of the production cycle, involves coating the food with an oil-containing layer, for a taste similar to gravy. One example of how to use the present embodiments would involve applying a probiotic on the kibbles as they pass by the delivery system on a conveyor, prior to applying the oil-containing substance. In this way, the latter substance will bind the probiotic to the food kibbles.

To accomplish the delivery of the particulate additives, be it probiotics or another type of particulate additive, a pneumatic system forces the particulate additives from a delivery tube in fluid communication with a primary air line and onto the food commodity. The particulate additives are delivered from a hopper, which in some embodiments is arranged as an inverse pyramid to facilitate the movement of particulate additives toward the bottom of the hopper. Present embodiments include those in which a primary air line, connected to a fan with options to be set at constant or variable speed, blows particulate additives entering the delivery tube into the surrounding environment where the food commodity is being moved along a production conveyor. The production conveyor passes close enough to the delivery tube outlet to allow the particulate additives to contact the food commodity. The fan speed is adjusted or otherwise set to provide enough velocity for the particulate additives to travel the necessary distance from delivery tube outlet to the food commodity on the line.

The primary air line provides the conveyance force needed to actually deliver the particulate additives from the body of the delivery tube, through the delivery tube outlet, and onto the food commodity. Additionally, some embodiments herein provide a secondary air line, with a different purpose than the first. The secondary air line interacts with a notched valve to provide volumetric control over the amount and rate of application of the particulate additives from the hopper. In some embodiments, the valve is a thin, solid rotating disc with an irregularly-shaped rim forming its perimeter, with dimensions generally corresponding with a sleeve that accepts the valve. In some embodiments, the irregular shape of the rim owes to the fact that the valve has a notch that is a full—or partial—thickness cutaway at the perimeter. Alternatively, the notch comprises an opening through the full thickness of the valve that is surrounded on all sides by the rim. Alternatively, some embodiments forego a secondary air line because the delivery tube is arranged with sufficient suction created from airflow to pull particulate additives through openings in the valve structure. Once particulate additive enters the delivery tube, the particles encounter the primary airflow and are ushered out of the delivery tube via the delivery tube outlet, and onto a commodity passing in close proximity to this outlet.

As will be explained in more detail below, the notch combined with airflow generated through the secondary line controls the flow of particulate additives from the hopper into a delivery tube connected to the primary line. From the delivery tube, particulate additive is forced out of a delivery tube outlet, and onto the food commodity. The size of the notch is a factor in determining the amount of particulate additives moved into the delivery tube. Moreover, in some embodiments, the valve is formed with a plurality of notches, each of which is positioned at a peripheral edge of the valve. The number of notches determines the frequency at which particulate additives is moved through the valve, and thereby into the primary airflow for application to the food commodity. In some embodiments the fan that generates primary airflow through the primary line also generates secondary airflow through the secondary air line.

Before particulate additives enter the delivery tube, they are placed in a hopper having an open space for storing a particular additive. In some embodiments, the hopper includes a hopper outlet for particulate additives to move through, e.g., under gravity. As desired, agitation in the hopper is provided such as by vibration or stirring to facilitate such movement in relation to the hopper outlet. The hopper outlet communicates with a sleeve that the valve fits into. In some embodiments, the sleeve is cylindrical with a circular cross-section, and the valve can be substantially circular except for its notch 68 formed therein. Alternatively, the valve can have other cross-sections to match the sleeve that it fits into, for example without limitation square, rectangular, hexagonal, and so forth.

In terms of spatial arrangement, one could consider an hour glass, with sands falling from a top section through a narrowed throat, and into a bottom section. The hopper described herein would be positioned like the top section, and the delivery tube through which primary airflow travels would be like the bottom section. Using the hourglass illustration, if one were to place a solid object into the throat, it would impede the sand from moving from top section to bottom section. If the solid object fit the dimension of the throat entirely, it would stop all such movement. If the solid object had a notch cutaway from it, however, this would limit the amount of sand moving from top section to bottom, but would not stop all such movement. In the present embodiments, the valve having a notch limits the amount of particulate additives moving from the hopper to the primary line, but allows some to pass through.

Accordingly, particulate additives move from the hopper onto a surface of the valve that acts as a partial impediment to particulate additives moving into the delivery tube. Furthermore, if two notches of equal area were formed on the valve, the rate would double at which particulate additives move from the hopper into the primary line, and with the three notches such rate would triple. The number of notches is non-limiting of the scope of embodiments, but provides an illustration for different valve configurations that will help control rate of application. Further, in some embodiments, the notched valve is inserted readily into and removed from the sleeve. In this way, different valve configurations can be used, providing flexibility for various needs and situations according to the weight, size and density of particulate additives, the percentage weight of particulate additives to be applied to the food commodity, and the speed of the production conveyor passing by the delivery tube outlet.

The secondary airflow functions in relation to the notched valve to move particulate additives into the delivery tube. From the delivery tube, the particulate additives move, under the force of primary airflow, out of the delivery tube via the delivery tube outlet. In some embodiments, the primary air line has a junction with the secondary line, and the cross-section of the primary air line tapers and becomes increasingly narrow upstream of this junction. Such a configuration results in a Venturi effect to increase the velocity of the primary airflow coming in contact with particulate additives that are entering the primary airflow, thus increasing the force urging the particulate additives out of the delivery tube via the delivery tube outlet.

As described in more detail below, the flexibility for the present embodiments is achieved with use of a standard hopper holding particulate additives with or without agitation. Particulate additives are urged out of the hopper, which can be under the force of gravity, or can be accomplished under pneumatic influence with blowers or suction. Particulate additives proceed from the hopper into a sleeve having a notched valve inserted therein that controls their passage through the sleeve. Inside the sleeve, a secondary airflow facilitates the movement of particulate additives through the notch opening in the valve and moving through a junction out of the secondary airflow and into a primary airflow. Once exposed to primary airflow, the particulate additives exit the delivery tube under force of primary airflow and via a delivery tube outlet where they contact the food commodity passing on a conveyor or similar component of a manufacturing system. Although a food commodity has been discussed in relation to present embodiments, such delivery systems can also be used for other production systems where a particulate additive is applied to an edible or non-edible object.

BRIEF DESCRIPTION OF DRAWINGS

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

MULTIPLE EMBODIMENTS AND ALTERNATIVES

Embodiments of the present disclosure include an applicator for delivering particulate additives from a hopper to a food commodity or other commodity undergoing production. Such an applicator includes a hopper, a primary air line through which primary airflow travels, and a delivery tube receiving the primary airflow. The delivery tube receives the primary airflow. Particulate additives enter the delivery tube from the hopper via a valve positioned therebetween, as further described below. The delivery tube has a delivery tube outlet through which the primary airflow passes in leaving the delivery tube and entering an environment surrounding the applicator. It is within such surrounding environment that a commodity passes nearby the applicator, and particulate additives then contact the commodity under the force of the primary airflow exiting the delivery tube. Embodiments also include those having a secondary air line communicating with the aforementioned valve. The secondary air line receives secondary airflow which urges particulate additive from the hopper to pass through the valve and into the delivery tube, such that particulate additives encounter the primary airflow and is ushered out of the delivery tube via the delivery tube outlet.

Accordingly, in some embodiments, particulate additives are applied to a food commodity under a combination of agitation, gravity, and pneumatic force in moving from a storage container where the particles are held, (i.e., hopper), through a sleeve that allows the particulate additives to pass through and controls the rate at which particulate additive is added to the delivery tube, and ultimately into primary airflow traveling through a delivery tube before exiting via a delivery tube outlet.

Figure 1:
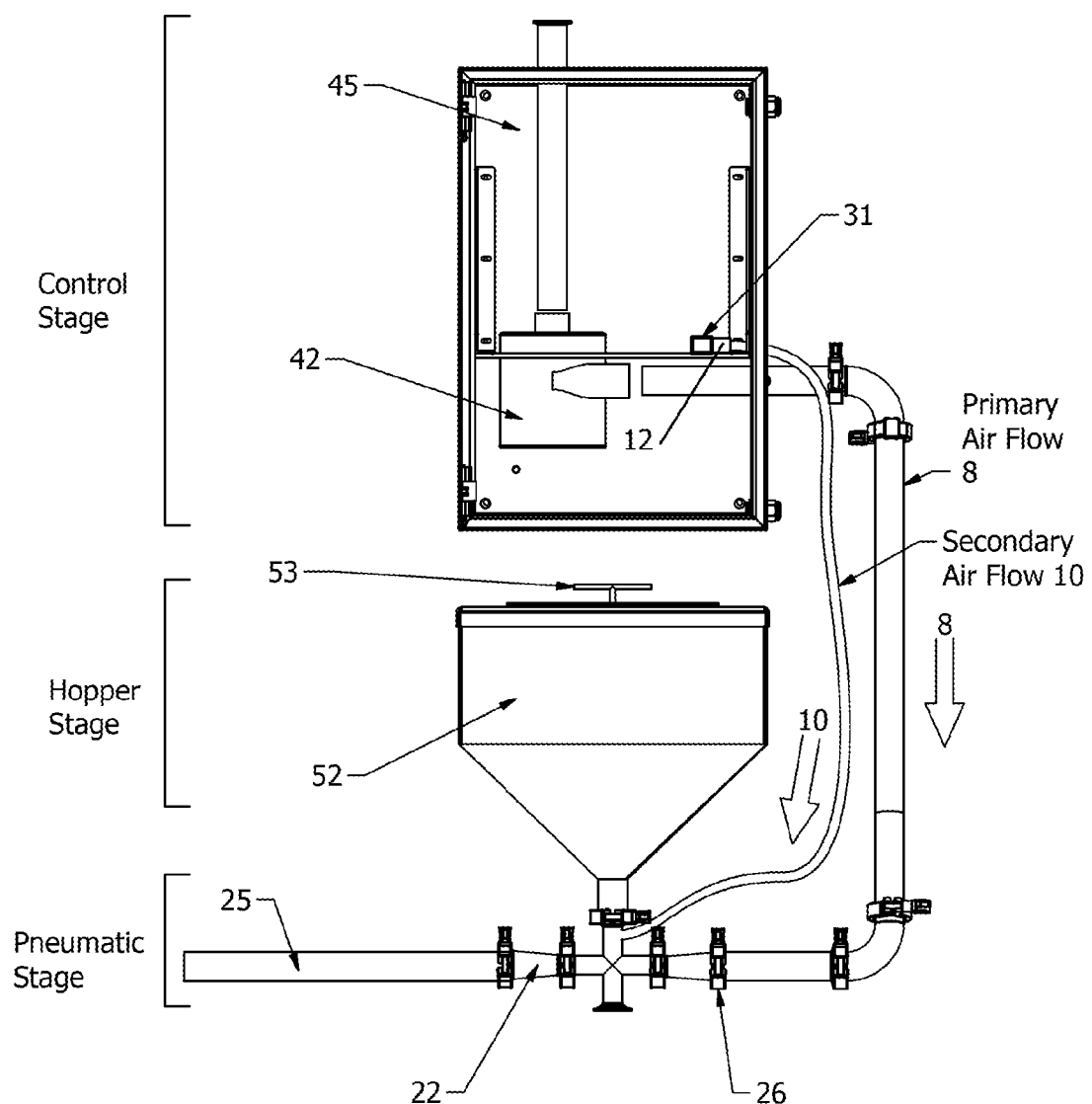
FIG. 1 is a schematic diagram of an applicator for delivering particulate additives, according to multiple embodiments and alternatives.
Figure 2A:
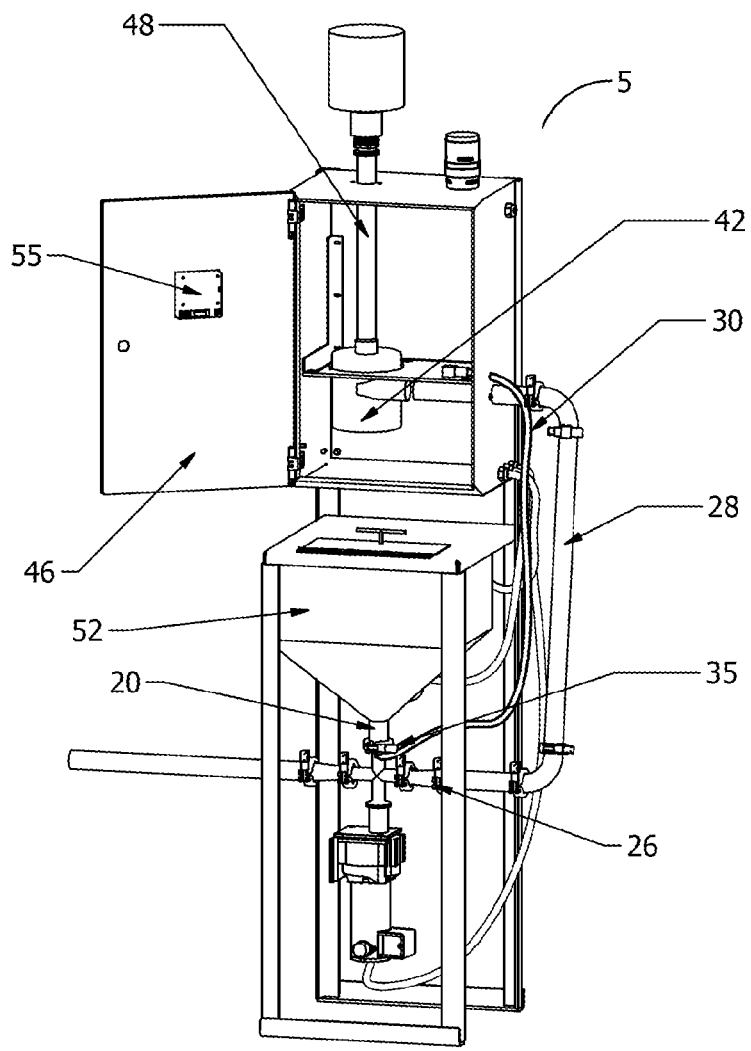
FIG. 2A is a perspective view of an applicator for delivering particulate additives, according to multiple embodiments and alternatives.

FIG. 1 and FIG. 2A depict the main features of such an applicator according to an embodiment. Three aspects of such an applicator are a controls stage, a hopper stage, and a pneumatic stage. The controls stage includes a fan as a source of primary airflow 8 that ushers the particulate additives out of the delivery tube. The controls stage includes pressure transducer 12 in fluid communication with secondary airflow 10 and reader 31 that registers the air pressure in secondary air line 30 delivering the secondary air flow and urging the particulate additives out of the sleeve, and converts the air pressure to a digital value shown on the reader. In some embodiments, fan 42 provides secondary airflow 10 through secondary air line 30 (the direction of which is indicated by an arrow). Through a hollow portion 21 of sleeve 20 (FIG. 5A), particulate additives move into delivery tube 22 where primary airflow 8 carries the particulate additives through delivery tube outlet 25 and into contact with the food commodity.

In some embodiments, primary air line 28 and secondary air line 30 are separate from each other and have different origins and termini. Fan 42 is the source of primary airflow through primary air line 28, which flows into delivery tube 22 at the point where it connects to the primary air line at joint 26. In some embodiments, primary air line 28, and secondary air line 30, both are configured to receive airflow generated by fan 42. The connections in the piping can be supplied by standard connectors known in the art. Optionally, the advantage of increased flow rate through a Venturi effect can be provided by reducing the diameter of delivery tube 22 at a constricted region 29 (FIG. 3A) beginning upstream of sleeve 20. The constricted region is marked by the diameter of the tube being reduced relative to other regions of the delivery tube, and particularly regions downstream of the constricted region, and this constriction results in a reduced air pressure upstream of where particulate additives enter the delivery tube and primary airflow. This reduced air pressure results in a compensatory increase in the rate of primary airflow traveling through the delivery tube. Generally, the fan speed is used as well to determine the distance particulate additives travel upon exiting applicator 5 via delivery tube outlet 25. In this way, the applicator is positioned with the delivery tube outlet proximal to part of a production line which can be a conveyor (not shown) for transferring commodities, so particulate additives exiting via the delivery tube outlet 25 will contact the commodities.

Further, sleeve 20 (e.g., see FIG. 1A, FIG. 3A, FIG. 4) is part of the pneumatic stage that communicates with secondary air line 30 to receive secondary airflow 10 via sleeve inlet 35. Sleeve inlet 35 generally is positioned at the same level as valve 65. Accordingly, the secondary airflow passing through inlet 35 contacts valve 65. Whenever a notch 68 of valve 65 aligns itself with sleeve inlet 35, the incoming airflow 10 forces particulate additives through the notch 65, urging the particulate additives through the hollow portion 21 of sleeve 20, and into delivery tube 22. In some embodiments, sleeve 20 is formed as part of the junction connector 40 and exists at what would be denoted as neck region 38 of junction connector 40. Alternatively, the sleeve is separate and connects to the junction connector by conventional connectors as known in the art.

Figure 3A:
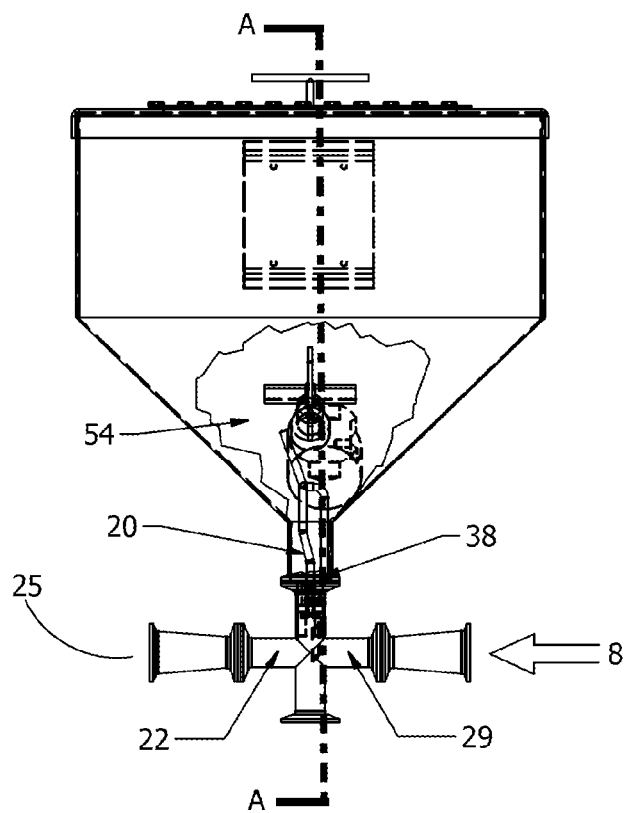
FIG. 3A is a cutaway view of the hopper and structures providing movement of particulate additives within the hopper, for an applicator for delivering particulate additives, according to multiple embodiments and alternatives.
Figure 3B:
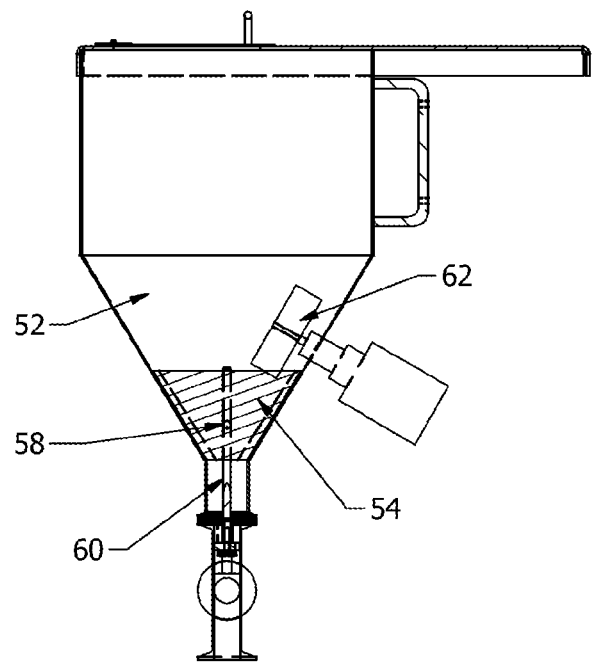
FIG. 3B is a cross-sectional view of the structures shown in FIG. 3A taken along line A-A as shown in FIG. 3A.
Figure 4:
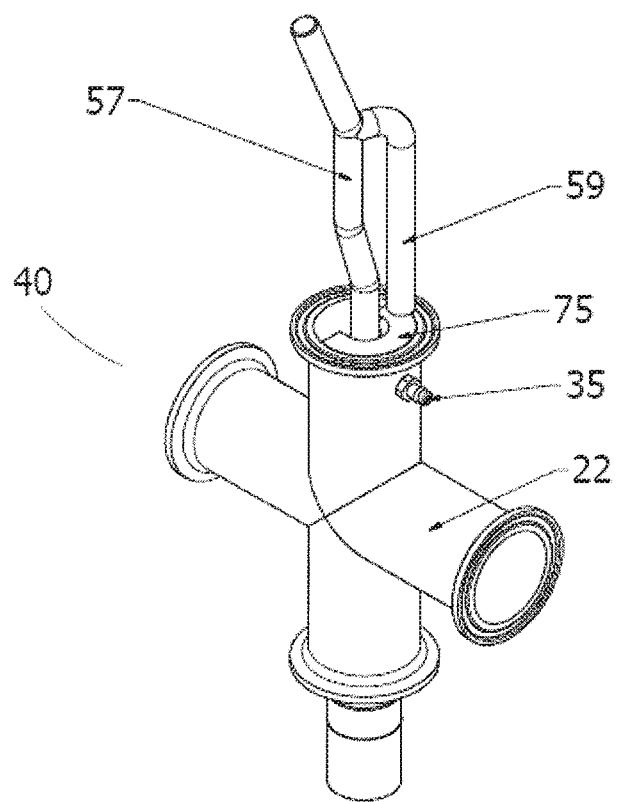
FIG. 4 is a perspective view of a junction connector as part of the pneumatic stage for an applicator for delivering particulate additives, according to multiple embodiments and alternatives.

FIG. 2A shows other structures of an applicator according to present embodiments. In some embodiments, fan 42 is located in control cabinet 45. In some embodiments, user interface 55 is positioned on a cabinet door 46 (i.e., user interface is accessed from the front of the cabinet door while FIG. 2A shows the door in the open position and thus the backside of the user interface is seen.) Fan 42 is connected to air conduit 48 that pulls air from the surrounding environment, and forces this air into primary air line 28 providing primary airflow 8. In FIG. 1 and FIG. 3A, a block arrow is used to indicate the direction of primary airflow. In some embodiments, a multi-speed fan is used having two or more constant settings, or this can be a variable speed fan. Generally, fan 42 can be any conventional piece of equipment producing an airflow, such as by the movement of one or more blades operating to produce torque output through rotation caused by the force of an electric motor or pump. In some embodiments, fan 42 is controlled with standard electronics and programming responsive to commands entered through a user interface 55. A suitable fan for these purposes is a BBA14-11 Series—Brushless DC Blower (120 volt AC input, multistage bypass) offered by Northland Motor Technologies, Watertown, N.Y., USA. Suitable for at least one or more purposes described herein, such as application of probiotic particulate on pet food moving on a conveyor in proximity (e.g., 6"-24") to applicator 5, would be a BBA14-112HEB model having a 1.75 in. (44.5 mm) outer diameter air inlet, and capable of pulling a vacuum of up to around 118 mBar at a maximum pressure up to about 130 mBar.

FIG. 2A, and FIGS. 3A and 3B also illustrate hopper 52 which is a standard receptacle with an open area 51 for holding particulate additives 54. As desired, a hopper door with handle 53 provides access to the interior of the hopper. Hopper 52 further has hopper opening 60 proximal to its bottom-most point. Opening 60 communicates with the aforementioned sleeve, which in FIG. 2A and FIG. 4 is shown as a neck region 38 of junction connector 40. As discussed with FIG. 4A, 4B and FIG. 5, sleeve 20 has additional structures that govern the movement of particulate additives into the primary airflow, which suction created by air flowing in the delivery tube and communicating with the sleeve contributes to. According to the embodiments described herein, a rate of particulate additives moving into the delivery tube and being exposed to primary airflow influences the rate of application of particulate additives to a commodity. Additionally, an adjustable setting for fan 42 influences the rate at which particulate additives are delivered. Such adjustments to fan 42 are among factors that determine where delivery tube outlet 25 should be positioned relative to the food manufacturing line, depending on how far a user needs to blow the particulate additives out of the delivery tube to contact the food commodity under production.

In some embodiments, applicator 5 employs user interface 55 to input primary airflow settings from the fan and secondary airflow for moving particulate additives out of the sleeve and into the delivery tube. As desired, user interface 55 is programmed to present one or more menu-type pages for a user to control fan speed supplying air to the primary airflow. In some embodiments, user interface 55 is a touch-screen that is connected electrically to other system components, such as fan 42, via cables and wires (not labeled) or wirelessly using conventional techniques. Likewise, as discussed herein, as valve 65 turns, at intervals notch 68 (either one notch or multiple notches) comes into alignment with the path of secondary airflow 10, which airflow causes the particulate additives to be blown into primary air line 28. The user interface 55 provides options to the user to set the valve speed to adjust the turning of valve 65 within sleeve 20, in turn determining the frequency at which notch 68 aligns with secondary airflow. User interface settings can be provided for both manual operation/adjustment and automatic setting of fan speed, valve position and turning, and/or agitation. In some embodiments, valve 65 is turned by an electric motor that rotates a gear 64 to transmit a turning force upon valve 65, e.g., a gear having teeth which mesh with a complementary toothed part (not shown) of the valve.

Accordingly the speed of rotating valve 65 is one way to control the frequency and amount of particulate additives moving into primary airflow 8. In some embodiments, valve 65 is formed with an orifice 70 in its surface apart from the notch, which is either partially or fully through its thickness. Orifice 70 matably receives a portion of rotating member 58, the latter being responsive to the turning of valve 65 so that it rotates in response to the rotation of the valve. In some embodiments, this responsiveness is due to the cross-sectional geometry of the inner opening surface of orifice 70 corresponding with an outer profile of at least a portion of rotating member 58. A turning fork as best seen in FIG. 4 has two shaft-like prongs in a wish-bone configuration and is a type of rotating member, but other configurations and types of rotating members could be used as well. For example, a structural member having a length and an outer profile in the form of a single vertical shaft that fits through orifice 70, has a profile of its outer diameter shape that corresponds to the cross-sectional geometry of the inner opening surface of orifice 70, and consequently turns in response to the rotation of valve 65 also is a rotating member, which could be substituted for turning fork as illustrated in the figures.

In some embodiments user interface 55 is connected to program logic (i.e., executable machine-readable instructions such as control software involved in transmitting and receiving inputs and outputs) that controls the rate of turning of fork 58, the speed of fan 42 supplying primary air flow to primary and secondary air lines 28, 30, respectively. Conventional electronics control the fan 42, primary airflow 8, pressure transducer 12, and secondary airflow 10. In some embodiments, conventional circuit boards and microprocessors (not shown) are used with the control software to govern the movements of rotating member 58 as well as the timing, force, and delivery of airflow involved in applying the particulate additives to a commodity moving past the delivery tube. In an example operation, a flowrate of about 60 cubic feet per minute at a pressure of 20 inches $H_2O$ is sufficient to draw particulate probiotics from a hopper through the applicator system and onto bulk products passing in proximity to delivery tube outlet 25.

In some of the accompanying drawing figures, rotating member 58 is shown as a turning fork, with a first prong 57 and a second prong 59. An advantage to a turning fork is that its first prong 57 engages valve 65 valve to cause it to rotate, while its second prong 59 moves under the same turning impulse, yet remains in the open area 51 of hopper 60 providing gentle agitation of particulate additives. This facilitates the flow of particulate additives into sleeve 20 and then into the primary airflow 8, and it biases the movement of older material in the hopper into the sleeve before material that was placed in the hopper more recently.

FIG. 3A is a perspective view providing further illustration of hopper 52, with FIG. 3B providing a cross-sectional view of the structures shown in FIG. 3A taken along line A-A as shown in FIG. 3A. Hopper sensor opening 62 is shown distal to hopper opening 60. Sensor 62 can be a vane that registers pressure or weight placed upon its surface to indicate if the amount of particulate additives in the hopper has fallen below the level of the sensor. If so, an alert is provided by means of an alarm. More proximal to hopper opening 60, FIG. 3B and FIG. 4 show rotating member 58 as a turning fork with one of its prongs moving particulate additives within open area 51 of hopper 52. As valve 65 rotates because of first prong 57 as described in the preceding paragraph, most of the particulate additives entering sleeve 20 will rest on a top surface of the valve. However, some of the particulate additives will fall or otherwise move into the space formed by the cutout of the notch. In some embodiments, sleeve 20, valve 65, and notch 68 are configured so that notch 68 aligns with secondary airflow at intervals, such that secondary airflow blows the particulate additives through the sleeve and into primary airflow 8.

Figure 6:
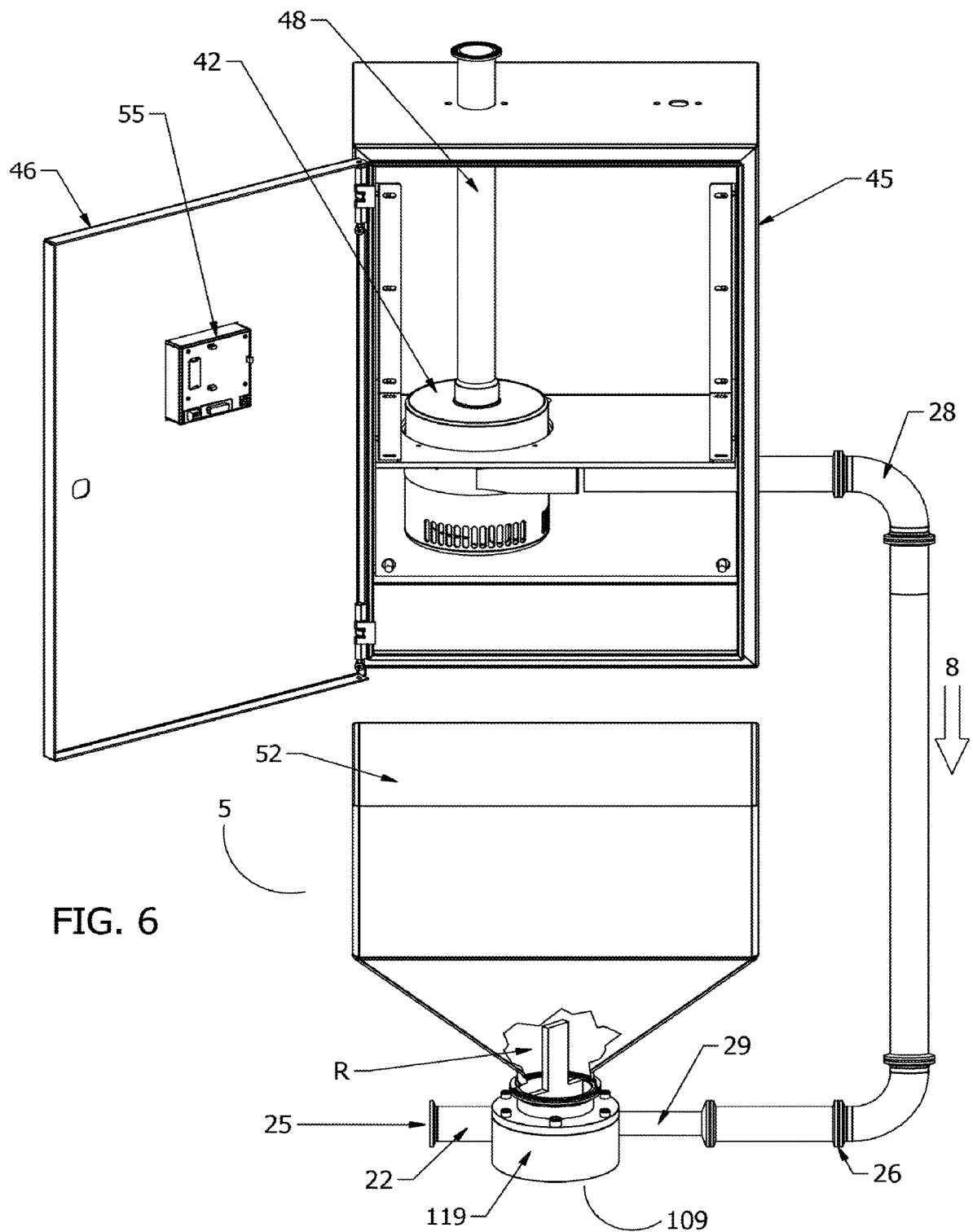
FIG. 6 is a perspective view of an applicator for delivering particulate additives, according to multiple embodiments and alternatives.
Figure 7:
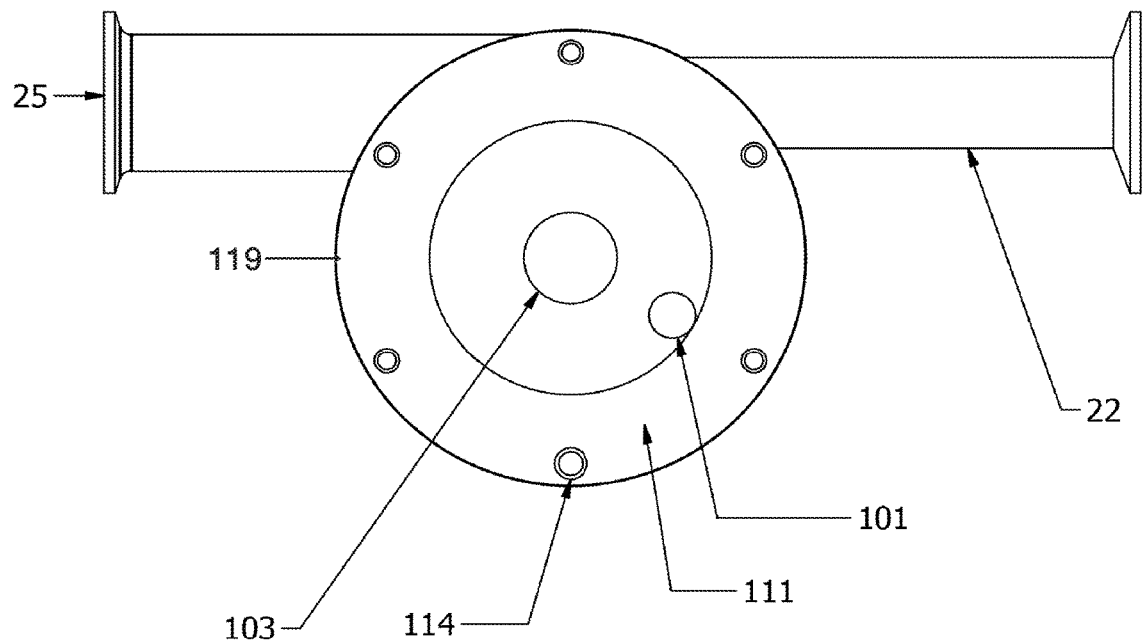
FIG. 7 is a top elevation view of part of an applicator for delivering particulate additives, namely the base of a receptacle connected to a delivery tube, according to multiple embodiments and alternatives.

Accordingly, valve 65 provides fluid communication between hopper 52 and delivery tube 22, wherein in some embodiments valve 65 fits inside sleeve 20 with the perimeter of valve 65 corresponding substantially to the inner dimension of the sleeve. Substantially in this sense refers to the notch 68 gives an irregular shape to the valve that might not correspond entirely with the sleeve inner dimension. This notch provides a space for particulate additive to collect where it can be blown out of the notch, such that valve 65 allows particulate additive to pass through sleeve 20 so it can enter delivery tube 22. As particulate additive exits sleeve 20 through valve 65, it encounters primary airflow 8 which is moving through delivery tube 22. Consequently, the number of notches and the speed of rotation of the valve are substantial factors in the rate of movement of particulate additives from the hopper and into the primary airflow. The more times particulate additives enter a space defined by a notch, the larger the quantity of these additives will enter into the delivery tube.

As FIG. 4 and FIG. 5A further illustrate, in some embodiments junction connector 40 includes part of a conduit by which primary airflow travels in the form of delivery tube 22. It is through the delivery tube that particulate additives travel from hopper 52 and enter the primary airflow before exiting via delivery tube outlet 25. FIG. 4 offers a perspective view of such a junction connector with related structures in place. FIG. 5A offers an exploded view of the sleeve, located in a portion of the junction connector known as the neck, along with valve 65, shoulder 75, and rotating member 58.

In earlier paragraphs, the relationship of a turning fork and a valve was described in which a prong of the turning fork matably inserts into an opening in the valve so the valve rotates as the turning fork prong rotates. Alternatively, shoulder 75 is an additional sleeve component, positioned between the valve and the turning fork (or other type of rotating member as the fork configuration is non-limiting). Shoulder 75 can be of various shapes and geometries, e.g., semi-circular with a concave region 76. It must be of proper dimension to fit within sleeve 20. In some embodiments, rotating member 58 matably inserts through an opening in shoulder 75, so that the shoulder rotates as the rotating member rotates. The profile of the prong matches the inner dimension of the opening of the shoulder and creates a snug fit sufficient to rotate shoulder 75 as the prong rotates. The rotation of shoulder 75 acts like a blunt object urging particulate additive falling into the sleeve to distribute itself unevenly on the top surface of valve 65, with more particulate additive falling to one half of the top surface of valve 65 than to the other half. In this fashion, a greater volume of particulate additive exists on top of the valve surface in closer proximity to notch 68 of valve 65.

As an example of the broad scope of current teachings, in yet other embodiments shoulder 75 can be stationary. This might occur as by the prong fitting through the opening of shoulder 75, wherein such opening has an inner dimension (e.g., diameter) so large that the outer profile of the prong never engages with, nor is restricted from rotating by, the inner dimensional surface of such opening. As desired, an interference fit can be achieved between shoulder 75 and the inner surface of sleeve 20 to further restrict movement of shoulder 75 relative to sleeve 20, while allowing only valve 65 to rotate in response to rotation of the prong. Such an interference fit can be through any of a number of known techniques, e.g., ridges on the outer surface of shoulder 75 that fit snugly within grooves formed in the inner surface of sleeve 20.

In some embodiments, one or more of the individual components shown in FIG. 5A are formed integrally as a single piece. Alternatively, they are separate so they can be easily removed. An advantage to separate components is that one valve can be removed from the sleeve very quickly and easily, and another inserted in its place. Valve removal involves withdrawing the turning fork and taking shoulder 75 from sleeve 20, which can but need not be fixed or permanently attached within the sleeve. Once shoulder 75 is removed, valve 65 is accessed easily for removal. Likewise, advantages are realized by such easy removal, in that a different valve configuration can be inserted.

In this regard, FIG. 5B shows an alternative valve design with a simple variation. Instead of a single notch, FIG. 5B shows two notches, 68 and 68', respectively. By comparison, the valve shown in FIG. 5B would usher particulate additives into the primary airflow at twice the rate as a single-notch valve, because there would be twice as many instances where the notch aligns with the secondary airflow that enters the sleeve through the secondary air line via the sleeve inlet. Many other configurations of the valve are possible, and except as specifically recited in a claim, the current embodiments are not limited by the number of notches formed in the valve, the shape, or the dimension of the valve. In general, valve 65 must fit inside sleeve 20 and it is beneficial for the valve shape to substantially (though not completely due to one or more notches) correspond to the inner diameter of the sleeve.

Components of applicator 5 can be formed from various materials as selected by a user. In some embodiments, primary air line 28, and junction connector 40 including delivery tube 22 are formed from metal. Likewise, hopper 52 and control cabinet 45 where the controls stage may be positioned are also formed of durable materials like metal or high density plastic. Optionally, secondary air line 30 is formed of conventional plastic or a suitable grade polymer, but metal or other materials can be selected as well. In some embodiments, junction connector 40 and delivery tube 22 are formed integrally and may include primary air line 28 as an integral structure. Alternatively, primary air line 28 is separate and joined to junction connector 40 with known connectors as are known in the art. Junction connector 40 can take other forms and exist in different configurations besides what is illustrated in the drawings. In some embodiments, junction connector 40 includes a sleeve configured to be positioned between the delivery tube portion of junction connector 40 and the hopper. Thus, it is an option though not a requirement for junction connector 40, delivery tube 22, and sleeve 20 (the latter positioned in a neck region 38 of junction connector 40) to be formed integrally. Any distinction between components formed integrally as opposed to separate components attached with connectors is not meant to be limiting.

Turning now to another aspect of applicator 5, in some embodiments, receptacle 109 comprises a base section ("receptacle base") 119 as seen in FIGS. 6, 7 among others, which is attached to and in communication with delivery tube 22 as described above. A disc 105 fits inside receptacle base 119 and controls the passage or restriction of particulate additives from hopper 52 to delivery tube 22. Receptacle 109 further includes a receptacle basin 116 that receives particulate from hopper 52, in which this receptacle basin is the portion of the receptacle that fits into an opening in hopper 52. In some embodiments, this receptacle basin 116 comprises side walls and a bottom surface 104 which includes opening 102 through which particulate material passes.

Figure 5A:
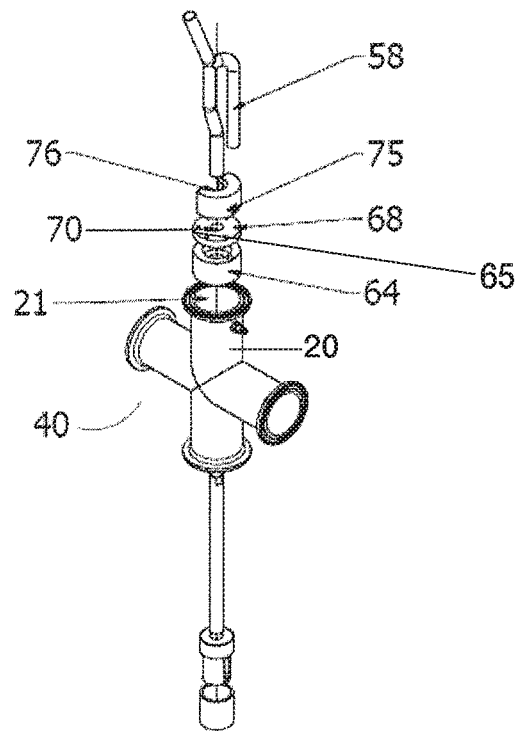
FIG. 5A is an exploded view of components associated with the junction connector of FIG. 4, according to multiple embodiments and alternatives.
Figure 5B:
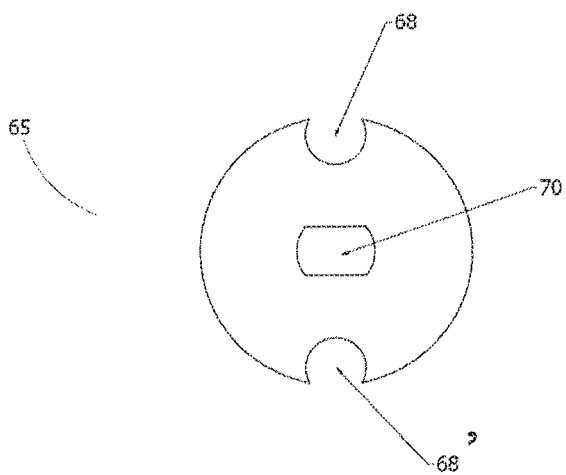
FIG. 5B is a perspective view of an alternative form of one of the components shown in FIG. 5A, according to multiple embodiments and alternatives.
Figure 9:
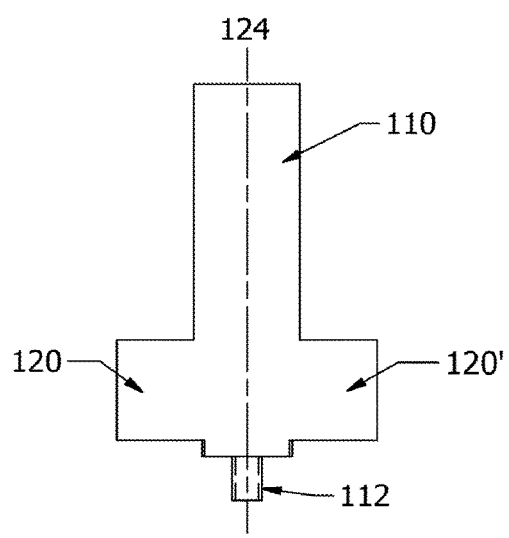
FIG. 9 is a particulate guide used in an applicator for delivering particulate additives, according to multiple embodiments and alternatives.

Embodiments further include a particulate guide 110 as shown in FIG. 9 which has at one end a threaded region with threads 112 that mate with a motor-driven gear 64 referenced in connection with FIG. 5A. Particulate guide 110 fits snugly into mateable opening 115 formed in disc 105 so that gear 64 transmits a turning force upon particulate guide 110 causing it to rotate, and which also results in causing disc 105 to turn at the same rate and frequency of rotation.

Figure 10A:
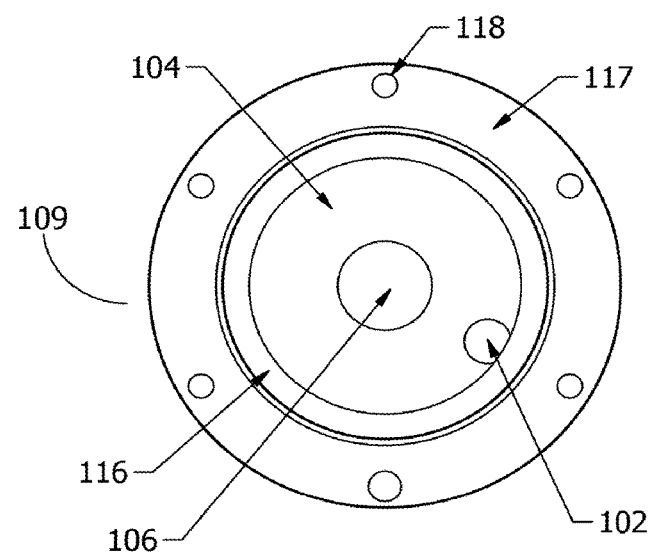
FIG. 10A is a top elevation view of part of an applicator for delivering particulate additives, namely the basin of a receptacle that receives particulate additives from a hopper as shown in FIG. 6, according to multiple embodiments and alternatives.
Figure 10B:
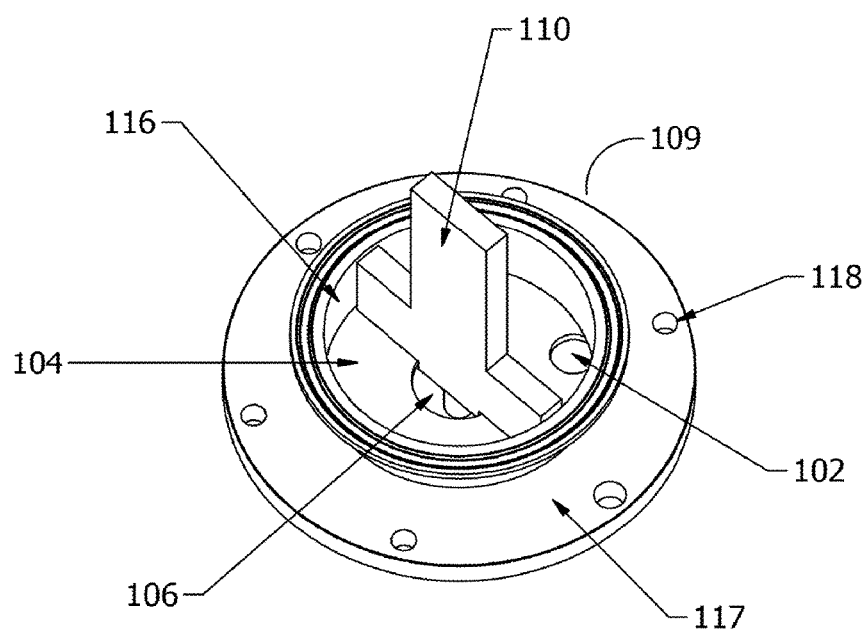
FIG. 10B is a top elevation view of part of an applicator for delivering particulate additives, according to multiple embodiments and alternatives.

Receptacle 109 further comprises a section as shown in FIGS. 6, 10A, and 10B among others. In some embodiments, this is a top section which takes the form of receptacle basin 116, which is fitted over and connected to receptacle base 119. It will be appreciated that sections 116, 119 can be formed integrally with each other and with delivery tube 22, or these sections may be formed as separate units and connected. Whether these pieces are formed separately or integrally, the aforementioned particulate guide 110 fits through hole 106 formed in a bottom surface 104 of receptacle basin 116, and it also fits through hole 103 formed in receptacle base 119.

FIGS. 6, 7, 10A, and 10B further illustrate that receptacle basin 116 has an opening 102 for particulate aligned with an opening 101 in receptacle base 119 to receive particulate such that particulate will move through these aligned openings. Generally, openings 101, 102 are aligned relative to one another forming a fluid path for particulates to pass under suction, moving from receptacle basin 116, through receptacle base 119, and into delivery tube 22. However, as disc 105 (located between receptacle basin 116 and receptacle base 119) rotates, at times when solid surfaces of disc 105 block the aligned openings 101, 102, it prevents any particulate from passing through to delivery tube 22. Conversely, disc 105 also is configured with cutouts 107 which periodically move into position between the aligned openings 101, 102 in receptacle base 119 and receptacle basin 116 where the particulate congregates.

In this way, disc 105 serves as a binary means of permitting or restricting passage of particulate. When the disc's cutouts 107 are aligned with openings 101, 102, the forces acting on the particulate at the bottom surface 104 of receptacle basin 116 draw the particulate through openings 101, 102. But when cutouts 107 are not aligned with these openings, no particulate passes as the solid surface of the disc prevents passage. Thus, the rate of turning of disc 105 as well as the number of cutouts 107 formed in disc 105 will influence the rate at which particulate moves through the aligned openings 101, 102 and pass into delivery tube 22.

The forces acting on the particulate may include gravity, if hopper 52 is situated higher than delivery tube 22, as well as suction coming from delivery tube 22 which is in communication with receptacle 109 via openings 101, 102. As desired, other mechanical or pneumatic forces can be provided to urge particulate from basin 116 to delivery tube 22 by movement through aligned openings 101, 102 as influenced by the binary rotation of disc 105 (binary in the sense that either the cutouts are aligned with opening 101, 102 or the solid surface of disc 105 are so aligned).

With more reference to the drawing figures, FIG. 6 shows only one conduit of airflow, unlike embodiments depicted by FIG. 2A which illustrated both primary and secondary airflow. Rather than secondary airflow, with embodiments in accordance with FIGS. 6-10B, gravity and suction move the particulate from hopper 52 into receptacle basin 116 as the particulate passes through receptacle 109, ultimately moving through receptacle base 119 that is in communication with delivery tube 22 and into the airflow provided through that tube. Once in the airflow of delivery tube 22, particulate is forcibly ejected from delivery tube 22 via delivery tube outlet 25. Upon being ejected, particulate contacts bulk commodities such as pet food traveling past applicator 5, for example on a conveyor. Upon exiting delivery tube 22, the particulates may form a cloud-like mass over the passing commodity, resulting in the particulates contacting the solid surfaces of the commodity such as pet food or other bulk goods. Embodiments are not limited to any particular angle of delivery tube 22 to a conveyor or other means of transport (not shown) of commodity products passing in proximity. Delivery tube may be oriented parallel to the conveyor surface, above or over, and the trajectory of the particulates emitted via delivery tube outlet 25 can be varied based on delivery tube positioning and settings for fan speed and frequency of turning of the particulate guide 110. Herein, the terms "particulate" and "particulates" are used interchangeably, and these terms include what has been referred to as "particulate additives."

Figure 2B:
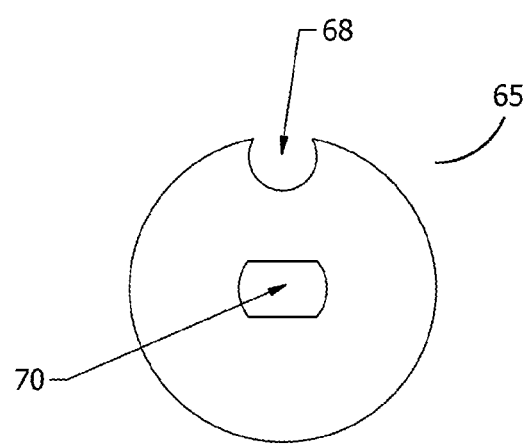
FIG. 2B is a perspective view of a notched valve for an applicator as shown in FIG. 2A, according to multiple embodiments.

As shown in FIG. 2, primary airline 28 is denoted by directional block arrow 8, and for purposes of FIGS. 6-10B this is referred to, simply, as airflow conduit 28 because there is not a source of secondary airflow for these figures. The conduit may be formed in a single piece or in multiple pieces connected with one or more joints 26. In some embodiments, airflow conduit 28 contains a constricted region 29. As known to persons having skill in the art, such a configuration results in a Venturi effect to increase the velocity not only of the airflow through delivery tube 22, thus increasing the force urging the particulate additives out of the delivery tube via delivery tube outlet 25, put also increasing suction that pulls particulate through holes 101, 102 when they are aligned with the cutouts of the disc.

FIG. 6 further shows a cut out section in hopper 52 denoted by region "R". Portions of what is seen through this cut out in region "R" are best seen in FIGS. 9, 10A, and 10B. These portions include receptacle basin 116 which fits through an opening in hopper 52 and is positioned to receive particulate from the hopper. As desired, a sensor hopper can be utilized to maintain the amount of particulates in the hopper, as previously noted. As particulate guide 110 rotates, particulates congregate near a bottom surface 104 of receptacle basin 116. Some of the particulates are ushered into opening 101 by protrusions 120, 120' flaring outward from particulate guide 110 in accordance with the configuration seen in FIG. 9. In the figures, hopper opening is not visible but an opening at the bottom of a hopper for storing particulates or other materials is known in the art and is a common means of allowing the materials to exit under gravity. It is through this opening that receptacle 109 fits snugly. At a minimum this would be to maintain fluid contact between the contents of hopper 52 and receptacle basin 116, and ideally such contact would be sufficiently held to prevent particulate from escaping as it passes from this hopper into this receptacle basin. As desired, seals and gaskets (not shown) can be used to maintain contact between hopper 52 and receptacle 109, the latter serving as the point of entry via aligned holes 101, 102 for particulates into the delivery tube 22.

FIG. 6 further shows, situated above hopper 52, control cabinet 45 having many of the same features as described in connection with FIG. 2A. For example, a cabinet door 46 provides access from the front of the cabinet with a user interface 55 providing adjustable settings for the system. As with FIG. 2A, fan 42 is connected to air conduit 48 that pulls air from the surrounding environment, and forces this air into airflow conduit 28 providing a flow of air through the conduit denoted by block arrow 8. Conventional electronics control system components such as fan 42, airflow denoted by block arrow 8, and a pressure transducer for monitoring and controlling pressure through the conduit.

Figure 8A:
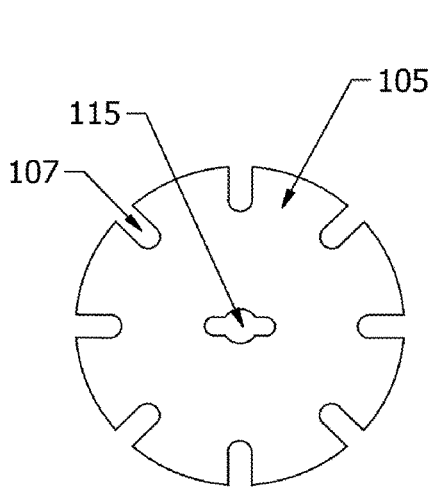
FIG. 8A is a plan view of a disc used as part of an applicator for delivering particulate additives, according to multiple embodiments and alternatives.
Figure 8B:
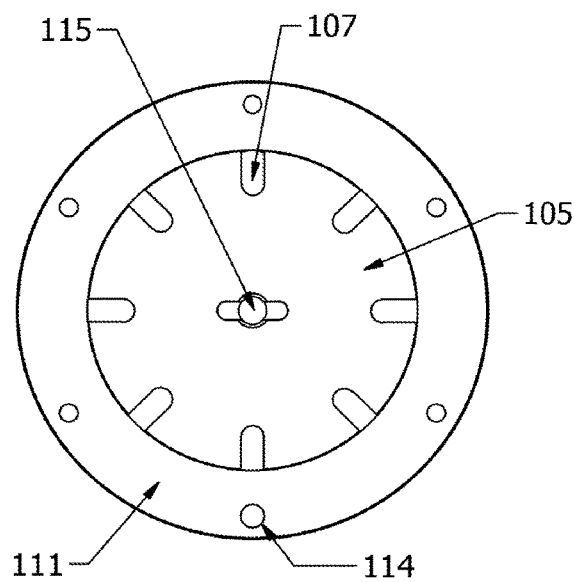
FIG. 8B is a perspective view of the disc of FIG. 8A fitted with the base of FIG. 7 as part of an applicator for delivering particulate additives, according to multiple embodiments and alternatives.

Generally, FIGS. 7, 8A, and 8B illustrate the lower section of receptacle 109 that immediately connects to delivery tube 22. It is through this lower section (or, second section) of receptacle base 119 that particulate passes on its way to delivery tube 22 under the force of suction from airflow through delivery tube 22. FIG. 7 is a top down illustration of receptacle base 119 of receptacle 109 situated atop and otherwise in communication with delivery tube 22, for example by an opening in delivery tube 22 that aligns with opening 101 of receptacle basin 119. Such an opening in delivery tube 22 would be similar to hollow portion 21 of sleeve 20 discussed with FIG. 5A in connection in connection with the primary/secondary air flow aspects of the current embodiments.

Also in these figures, it will be seen that receptacle 109 comprises hole 103 for particulate guide 110 which is used in ushering particulate into position of opening 101 in proximity to delivery tube 22. As previously noted, opening 102 aligns with opening 102 of basin 116. FIG. 7 also shows receptacle base 119 comprising base perimeter 111 that will line up with receptacle perimeter 117 of receptacle basin 116, making up two attachable sections of receptacle 109 in an embodiment. As desired, these sections are bolted as FIG. 7 illustrates, with optional threaded base openings 114 used in making this mechanical connection. Preferably, when connected receptacle base 119 and receptacle basin 116 form good contact so that suction derived from flow of air in delivery tube 22 is maintained at sufficient levels to draw particulate through aligned openings 101, 102 whenever cutouts 107 of disc 105 lineup between those two openings as disc 105 turns in response to the movement of particulate guide 110.

FIG. 8A offers a perspective view of disc 105 in isolation with 8 cutouts 107 about its periphery. While shown around the periphery in the drawings, these cutouts can be formed on the interior of the disc as well, depending on the location of the aligned holes 101, 102. For convenience, only one of the cutouts is numbered. FIG. 8 also shows mateable opening 115, of which one function is to receive an end of particulate guide 110. As will be seen in discussion of other figures, e.g., FIG. 9 and FIG. 10B, in some embodiments the end of particulate guide 110 is configured with threads 112 that feed into a gear 64 so as particulate guide 110 moves within the disc's mateable opening 115, it also causes the disc to rotate. Accordingly, mateable opening 115 is sized and shaped for a snug fit with particulate guide 110.

FIG. 8B is a plan view of receptacle base 119 with disc 105 fitted into position. The 8 cutouts 107 are seen here, but it will be appreciated that any number of cutouts is suitable for use with the current embodiments described herein. The cutouts 107 are illustrated as semi-ovals, but other shapes are within the scope of embodiments, such as semi-circular, circular, square cuts, rectangular, triangular, and hexagonal, to name some. FIG. 8B illustrates mateable opening 115 as discussed in connection with FIG. 8A, as well as base perimeter 111 and threaded base openings 114 that are involved in connecting receptacle base 119 to receptacle basin 116 as two sections of receptacle 109. However, it will be appreciated that while this is shown in multiple parts, receptacle 109 can be formed as integral pieces instead of separate ones. Even so, an advantage of having it in multiple parts is easy removal of disc 105 so that different disc can be switched and used.

FIGS. 9, 10A, and 10B illustrate the section of receptacle 109 more proximal to the hopper, which also can be referred to as a first section. A receptacle basin 116 is include with this section, into which a particulate guide 110 will be inserted. As shown in FIG. 9, in some embodiments particulate guide 110 is shaped as an upside down "T" with threads 112 at one end that can mate with the gear 64 for turning of particulate guide 110 in response to the rotation of the gear. In some embodiments, an end of threads 112 is inserted through hole 106 of the receptacle basin 116, and in like fashion through hole 103 as described before for the receptacle base 119. As previously discussed, it is these threads 112 that matably insert into gear 64 (previously discussed) so that, as this gear turns particulate guide 110, it also causes disc 105 to turn due to the snug fit between disc 105 and particulate guide 110 found at this mateable opening 115. In this way, particulate guide 110 rotates about a central axis 124, with its protrusions denoted by 120, 120' in FIG. 9 flared outward from its sides. FIG. 10A is a plan view of receptacle basin 116, with various features illustrated. It will be appreciated that as particulate guide 110 rotates inside of receptacle basin 116, its own rotational movement and the action of protrusions 120, 120' cause any particulate that falls into this open receptacle to also move circularly along bottom surface 104 of the basin, occasionally coming in contact with opening 102 (being aligned with opening 101 shown in FIG. 7.)

As shown in FIG. 10B, in some embodiments receptacle basin 116 further comprises a receptacle perimeter 117 that contains bolt openings 118 for receiving bolts to snuggly secure the two sections of receptacle 109. In a preferred configuration, the respective perimeters of receptacle base 119 and receptacle basin 116 align in such a way as to ensure that openings 101, 102 of the base and the basin also align.

FIG. 10B illustrates many of the same structures as previous figures, as a top elevation view showing a receptacle basin 116 section of receptacle 109. Particulate guide 110 is seen in position to rotate within this basin, and hole 106 for the particulate guide 110 is partially visible albeit partially obscured by an end of particulate guide 110 that fits through this hole. In this way, particulates dropping from hopper 52 into receptacle 109 will congregate on bottom surface 104 of receptacle basin 116 and the rotating action of particulate guide 110 causes the protruding edges 120, 120' of the particulate guide that flare outward to urge to particulate into opening 102. In those cases where a multi-part receptacle 109 is used, receptacle perimeter 117 and bolt openings 118 will accommodate insertion of bolts to attach the two main pieces. It will be appreciated that other means can be used to attach the receptacle basin 116 to the receptacle base 119, such as clamps, snaps, clasps, or any other means to retain basin 116 and receptacle base 119 in their alignment and preserve the suction force emanating from delivery tube 22.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. An applicator for moving particulates, comprising:

a receptacle that receives the particulates and is arranged in communication with a delivery tube;

wherein the receptacle further comprises a first opening through which the particulates pass and a second opening through which the particulates pass before entering the delivery tube;

a valve positioned between the first opening and the second opening, the valve comprising a rotating disc having a surface with at least one cutout;

wherein said first opening and said second opening are aligned to form a path for the particulates to pass from the receptacle into the delivery tube when at least a portion of the at least one cutout of the rotating disc is aligned with the first opening and the second opening, but to restrict passage of the particulates when no portion of the at least one cutout of the rotating disc is aligned with the first opening and the second opening.

2. The applicator of claim 1, further comprising a particulate guide and wherein the rotating disc further comprises a mateable opening to receive a portion of the particulate guide wherein the rotating disc is urged to rotate as the particulate guide rotates.

3. The applicator of claim 2, wherein the particulate guide contacts particulates as the particulate guide rotates within the receptacle.

4. The applicator of claim 1, wherein the rotating disc comprises a plurality of cutouts.

5. The applicator of claim 4, wherein the cutouts are positioned at a peripheral edge of the rotating disc.

6. The applicator of claim 1, further comprising a sleeve between the receptacle and the delivery tube and the sleeve being configured to hold the valve.

* * * * *